(No Model.)
E. F. OSBORNE.
METHOD OF MEASURING HEAT SUPPLIED FROM STEAM.
No. 255,884. Patented Apr. 4, 1882.
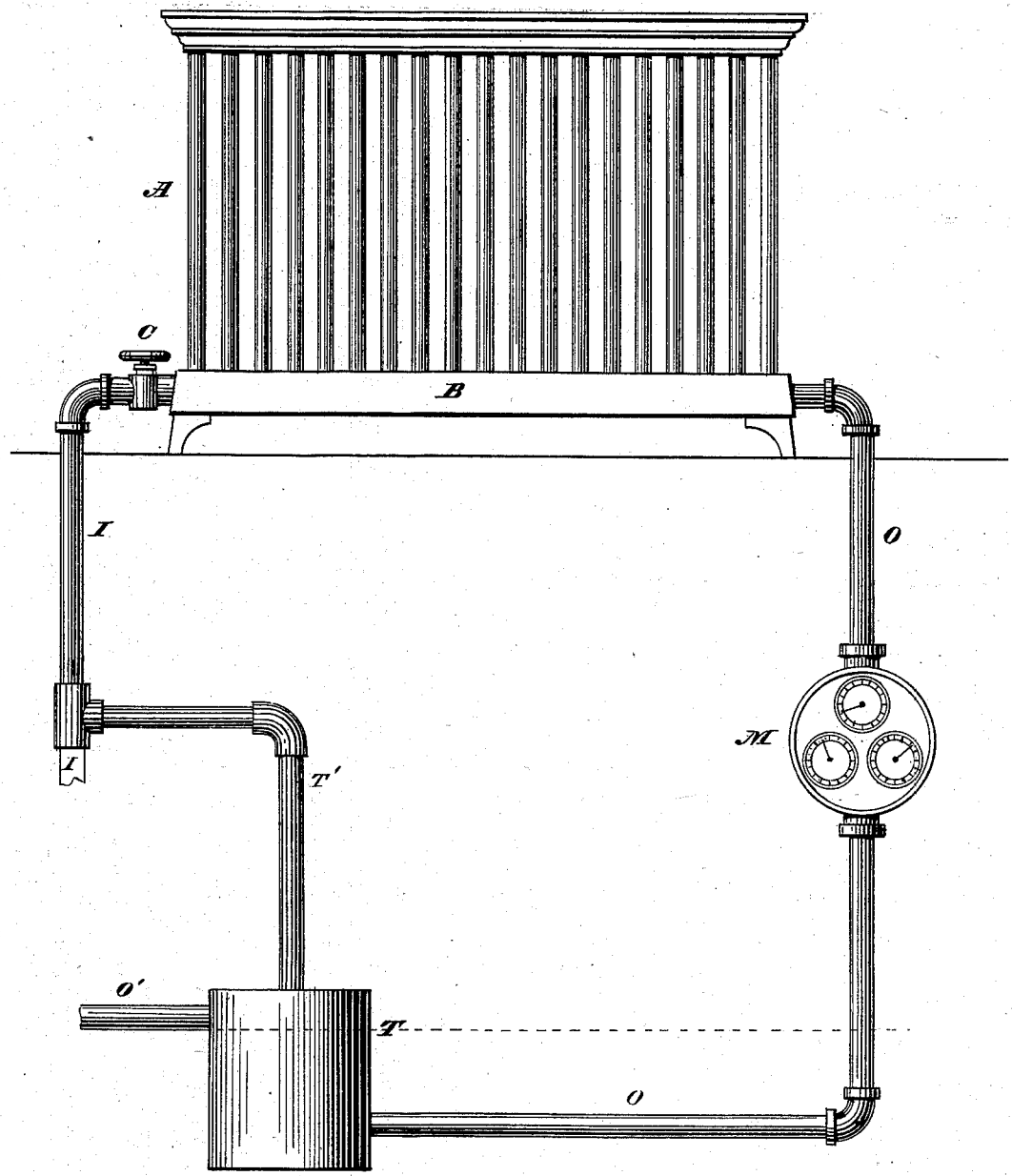

UNITED STATES PATENT OFFICE.

EUGENE F. OSBORNE, OF ST. PAUL, MINNESOTA.

METHOD OF MEASURING HEAT SUPPLIED FROM STEAM.

SPECIFICATION forming part of Letters Patent No. 255,884, dated April 4, 1882.

Application filed October 20, 1880. (No model.)

*To all whom it may concern:*

Be it known that I, EUGENE F. OSBORNE, of St. Paul, in the county of Ramsey and State of Minnesota, have invented certain new and useful Improvements in Methods of Measuring Heat Supplied from Steam; and I do hereby declare that the following is a full, clear, and exact description thereof, reference being had to the accompanying drawing, and to the letters of reference marked thereon, which form a part of this specification.

This invention relates to methods for determining the amount of heat imparted to a steam-heating apparatus by the steam supplied thereto; and it consists in the method, as hereinafter set forth, of, first, supplying the steam at a known pressure or temperature to a suitable heating apparatus; second, condensing the steam in said apparatus; and, third, measuring or weighing the water of condensation from said apparatus as a basis of calculation for determining the amount of heat supplied to the apparatus.

It further consists in the combination, with steam-heating apparatus operating to condense the steam supplied thereto, of a self-registering meter arranged to measure the water of condensation from said apparatus, and operating to indicate the quantity of the condensed water or the correlative quantity or value of the heat which it represents.

In the accompanying drawing, A is a steam-radiator.

I is a pipe supplying steam to the radiator, and O is a pipe discharging the water of condensation formed from the steam within the radiator.

The radiator A may, for the purposes of this description, stand for any form or extent of heating apparatus transmitting steam heat and operating to condense the steam supplied thereto in the act of transmission.

M is any suitable form of fluid-meter, provided with registering devices and adapted to meter hot water. Said meter is connected in the pipe O to measure the water discharged thereby.

T is any suitable form of trap giving a resistance equal to the pressure on the heating apparatus A.

As the water of condensation bears a definite relation to the heat of the steam condensed, (the pressure of the steam being taken into account,) the quantity of water registered by the meter will form a basis for determining, by a simple and well-known arithmetical calculation, the quantity of heat given off by the steam in the heating apparatus. Said register may obviously be constructed to indicate the correlative quantity of heat, or, if desired, the value of such heat expressed in dollars and cents or other units of value. Weighing the water of condensation is obviously the equivalent of metering the same for the purpose stated.

Having thus described my invention, I claim—

1. The method described of determining the amount of heat imparted by steam in a steam-heating apparatus, which consists in measuring or weighing the water condensed in said apparatus, and therefrom estimating the correlative amount of heat due to the condensation, reference being had to the pressure or temperature at which the steam is supplied to the apparatus, as set forth.

2. The method described of determining the amount of heat imparted by steam in a steam-heating apparatus, which consists in first supplying the steam at a known pressure or temperature to said heating apparatus; second, condensing the steam within said apparatus; and, third, measuring or weighing the water so condensed as a basis of estimate in calculating the quantity of heat supplied, as set forth.

3. In combination with steam-heating apparatus, means whereby the water condensed in such apparatus may be automatically weighed or measured and the quantity of such water registered, as and for the purpose stated.

In testimony that I claim the foregoing as my invention I affix my signature in presence of two witnesses.

EUGENE F. OSBORNE.

Witnesses:
M. E. DAYTON,
JESSE COX, Jr.